(12) United States Patent
Ferrara et al.

(10) Patent No.: US 12,374,965 B2
(45) Date of Patent: Jul. 29, 2025

(54) ELECTRIC ACTUATOR APPARATUS EQUIPPED WITH POSITION DETECTION SYSTEM AND RELATED ROAD VEHICLE

(71) Applicant: FERRARI S.P.A., Modena (IT)

(72) Inventors: Davide Ferrara, Modena (IT); Ugo Sitta, Modena (IT); Roberto Betro', Modena (IT); Giuseppe Agnello, Modena (IT); Paolo Faverzani, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 232 days.

(21) Appl. No.: 18/330,089

(22) Filed: Jun. 6, 2023

(65) Prior Publication Data
US 2023/0402903 A1  Dec. 14, 2023

(51) Int. Cl.
*H02K 11/22* (2016.01)
*H02K 1/27* (2022.01)

(52) U.S. Cl.
CPC .............. *H02K 11/22* (2016.01); *H02K 1/27* (2013.01)

(58) Field of Classification Search
CPC .... G01D 5/3473; G01D 5/34792; H02K 1/27; H02K 11/22; H02P 6/16
See application file for complete search history.

(56) References Cited

U.S. PATENT DOCUMENTS

| | | | |
|---|---|---|---|
| 2013/0229138 A1* | 9/2013 | Yoshida | G01D 5/34715 310/68 B |
| 2018/0329066 A1* | 11/2018 | Pacala | G01S 17/86 |
| 2021/0055136 A1* | 2/2021 | Sapija | G01D 5/3473 |
| 2021/0293584 A1* | 9/2021 | Ele | G01D 5/3473 |

FOREIGN PATENT DOCUMENTS

JP  S63210621 A  9/1988

OTHER PUBLICATIONS

Italian Search Report for Application No. 102022000012119; Filing Date: Jun. 8, 2022; Date of Mailing—Jan. 9, 2023, 8 pages.
Extended European Search Report for European Patent Application No. 23177945.5; Date of Mailing Oct. 20, 2023, 5 pages.

* cited by examiner

*Primary Examiner* — Naishadh N Desai
(74) *Attorney, Agent, or Firm* — CANTOR COLBURN LLP

(57) ABSTRACT

An electric actuator apparatus comprising: an electric motor, comprising in turn a stator and a rotor, which is configured to rotate about an axis according to the power transmitted by the stator; a control unit configured to control the electric motor via a feedback control; a position detection system configured to provide the control unit with an angular position of the rotor; a reading portion, which is integral to the rotor and provided with an encoded surface on which a plurality of codes that can be associated with the angular position of the rotor are fixed; an optical or laser sensor element, which is arranged integral to the stator and so as to point toward the encoded surface.

15 Claims, 5 Drawing Sheets

ELECTRIC ACTUATOR APPARATUS EQUIPPED WITH POSITION DETECTION SYSTEM AND RELATED ROAD VEHICLE

CROSS-REFERENCE TO RELATED PATENT APPLICATIONS

This patent application claims priority from Italian patent application no. 102022000012119 filed on Jun. 8, 2022, the entire disclosure of which is incorporated herein by reference.

TECHNICAL FIELD

The present invention relates to an electric actuator apparatus provided with a position detection system and a road vehicle thereof comprising such an apparatus.

In particular, the present invention is advantageously, but not exclusively, embodied in one or more electric actuators for highly performing vehicles, to which the following description will make explicit reference without thereby losing its generality.

BACKGROUND OF THE INVENTION

As well-known, in the field of vehicles (but also in general terms) the use of electric actuations is now widely widespread, both in terms of propulsion and comfort. In particular, all these actuators are usually governed by special control units, which operate by means of a control in position or in speed of the aforementioned actuators.

To carry out feedback controls, often necessary for safety reasons in relation to at least the electric motor of the propulsion system, angular position transducers are used, i.e., electromechanical devices that provide instant by instant the absolute or relative position of the rotor of the electric motor to be controlled, allowing de. Among these, digital devices are known, usually called encoders, which convert the angular position of a rotating axis (integral with the rotor of the electric motor to be controlled) into short electrical pulses that need to be processed by a signal analysis circuit in the form of digital numerical signals.

Furthermore, analogue devices are known, usually called resolver, in which they consist of an electromechanical device for the measurement of angular displacements allowing to detect the variation of magnetic induction flux, concatenated with a solenoid, as a function of the position of the solenoid itself (which is integral with the rotor of the electric motor to be controlled).

Of the aforementioned devices, over the years, several types have been developed.

In any case, encoders are usually used in applications requiring the prior search for a reference, in that they provide a relative position, that is, they encode the position (and its derivatives over time) of the motor rotor to be controlled in signals proportional to the displacement.

On the other hand, resolvers are able to provide a coding of the rotor position in absolute terms, but they usually have significant costs and dimensions, especially since they require at least the presence of a copper circuit (solenoid or track printed) concatenated with the variation of the magnetic induction flux of the machine (i.e., of the electric motor to be controlled) and of relative sensors.

Moreover, prior art devices are electromechanical and require careful and gentle assembly, usually by experienced personnel.

In addition, the prior art devices require dedicated circuitry at the transducer and within the road vehicle control unit.

In any case, both the above solutions, although functional, are susceptible to improvement according to the Applicant.

In general, the need is felt for further weight reduction, simplified assembly, and improved safety performance, as well as optimized cost management.

Finally, the devices of prior art are also expensive in terms of energy, especially in fully electric vehicles, in which the energy saving of non-propulsive components becomes increasingly relevant, so as to increase the vehicular autonomy.

DESCRIPTION OF THE INVENTION

An object of the present invention is to provide an electric actuator apparatus provided with a position detection system and a road vehicle thereof comprising such apparatus which are at least partially free from the drawbacks described above and, at the same time, are of simple and cheap realization.

According to the present invention, an electric actuator apparatus provided with a position detection system and a road vehicle thereof comprising such apparatus according to what is claimed in the following independent claims and, preferably, in any of the directly or indirectly dependent claims from the independent claims, are provided.

The claims describe preferred embodiments of the present invention forming an integral part of the present description.

BRIEF DESCRIPTION OF THE DRAWINGS

In the following, some embodiments of the invention will be described for a better understanding thereof by way of non-limiting example and with reference to the accompanying drawings in which.

EMBODIMENTS OF THE INVENTION

Figure 1:
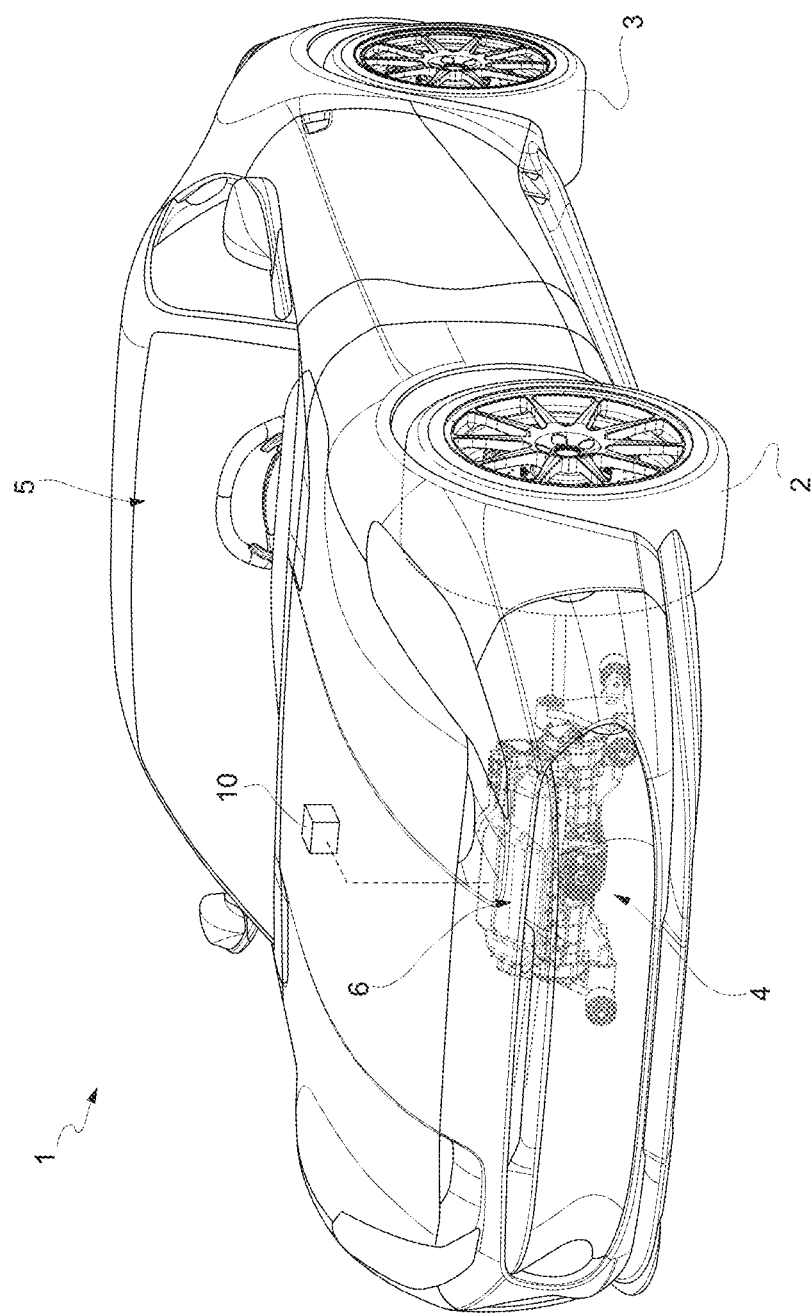
FIG. 1 is a perspective and schematic view, with details removed for the sake of clarity, of a possible embodiment of a road vehicle in accordance with the present invention.

In FIG. 1, 1 generally indicates, as a whole, a road vehicle provided with two front wheels 2 and two rear wheels 3, of which at least one pair (or all) receive the driving torque from a motor propulsion system 4. The motor propulsion system 4 can be exclusively thermal (i.e., it comprises only an internal combustion engine), hybrid (i.e., it comprises an internal combustion engine and at least one electric motor), or electric (i.e., it comprises only one or more electric motors).

Preferably, the road vehicle 1 is provided with a passenger compartment 5 which is adapted to accommodate at least one driver and preferably one or more passengers.

The same reference numbers and letters in the FIG. identify the same elements or components with the same function.

In the context of this description, the term "second" component does not imply the presence of a "first" component. These terms are in fact used as labels to improve clarity and are not to be understood in a limiting way.

The elements and features illustrated in the various preferred embodiments, including the drawings, can be combined or isolated from each other without however departing from the scope of protection of the present application as described below.

The road vehicle 1 comprises at least one electric actuator apparatus 6, which is provided with an electric motor 7.

The electric motor 7 comprises a stator 8 and a rotor 9, which is configured to rotate about a rotation axis A according to the (electric) power transmitted by the stator in known and therefore not further detailed manner. In particular, the electric motor 7 can be any type of electric machine (e.g., brushless, permanent magnet, inductance, synchronous, asynchronous, etc.).

The road vehicle 1 comprises an electronic control unit ("ECU") 10 which, among other things, is configured to control the electric motor 7 in feedback (i.e., closed loop, by means of known control algorithms and therefore not further elaborated). Physically, the control unit 10 can be composed of a single device or of several devices separated from each other and communicating through the local network (can, Ethernet, etc.) of the road vehicle 1.

To carry out the aforementioned feedback control, the apparatus 6 comprises a position detection system 11 configured to provide the control unit 10 with an angular position of the rotor 9 (and therefore of a motor shaft 12 connected thereto according to known techniques).

Advantageously, the apparatus 6 comprises a reading portion 13, which is integral to the rotor 9 and provided with an encoded (non-perforated) surface 14 on which a plurality of codes 15 that can be associated with the angular position of the rotor 9 are fixed (in particular, printed).

The apparatus 6 further comprises a sensor, optical or laser element 16, which is arranged integral to the stator 8 and so as to point toward the encoded surface 14.

Advantageously but not in a limiting way, codes 15 extend radially to the rotor 9 and are separated from each other. In other words, codes 15 are rows arranged in rugged pattern.

Advantageously but not in a limiting way, codes 15 are not circular sectors.

Preferably but not in a limiting way, the codes 15 determine an absolute reference on the position of the rotor 9; in particular, they are all different from each other.

Preferably, the encoded surface 14 is a seamless surface, i.e., without through holes. Thus, SPAD/CMOS chips can be used as described below. In addition, this avoids compromising the inertia of rotor 9 with holes that would alter its density.

According to some preferred non-limiting embodiments, such as those illustrated in FIGS. 2 to 5, the sensor element 16 is a photodetector 17 (i.e., a device capable of detecting an electromagnetic radiation, outputting a signal having a current intensity or a potential difference proportional to the intensity of the detected radiation).

In some preferred non-limiting cases, the sensor element 16 comprises one or more single-photon photodetector diodes 17 (known by the acronym SPAD). Preferably, the sensor element 16 is in the form of a SPAD/CMOS chip. By doing so, the sensor element 16 is able to read at extremely high speed the information contained in the encoded surface 14, even in dark conditions within the apparatus 6. This avoids adding weight to the road vehicle. In addition, this technology, nowadays unused in vehicular applications, would allow laser printing of encodings on the rotor without impacting its mechanical performance and ensuring sufficient durability of the encodings 15.

In other non-limiting and non-illustrated cases, the sensor element 16 is a miniaturized camera, which is configured to sequentially detect images of the encoded surface 14.

Advantageously but not in a limiting way, the encodings are arranged radially, in particular equidistant from each other to the rotation axis A of the rotor 9.

Preferably, the codes 15 are realized by laser printing.

According to some preferred non-limiting embodiments, the reading portion 13 is made of metal.

In particular, the reading portion 13 is made in one piece with the rotor 9 of the electric motor 7 or with the motor shaft 12. More precisely, the reading portion is a pre-existing part of the rotor 9 or a pre-existing part of the shaft 12. Thereby, assembly can be simplified as much as possible, which will be limited to fixing the sensor element 16 in the correct seat.

Figure 2:
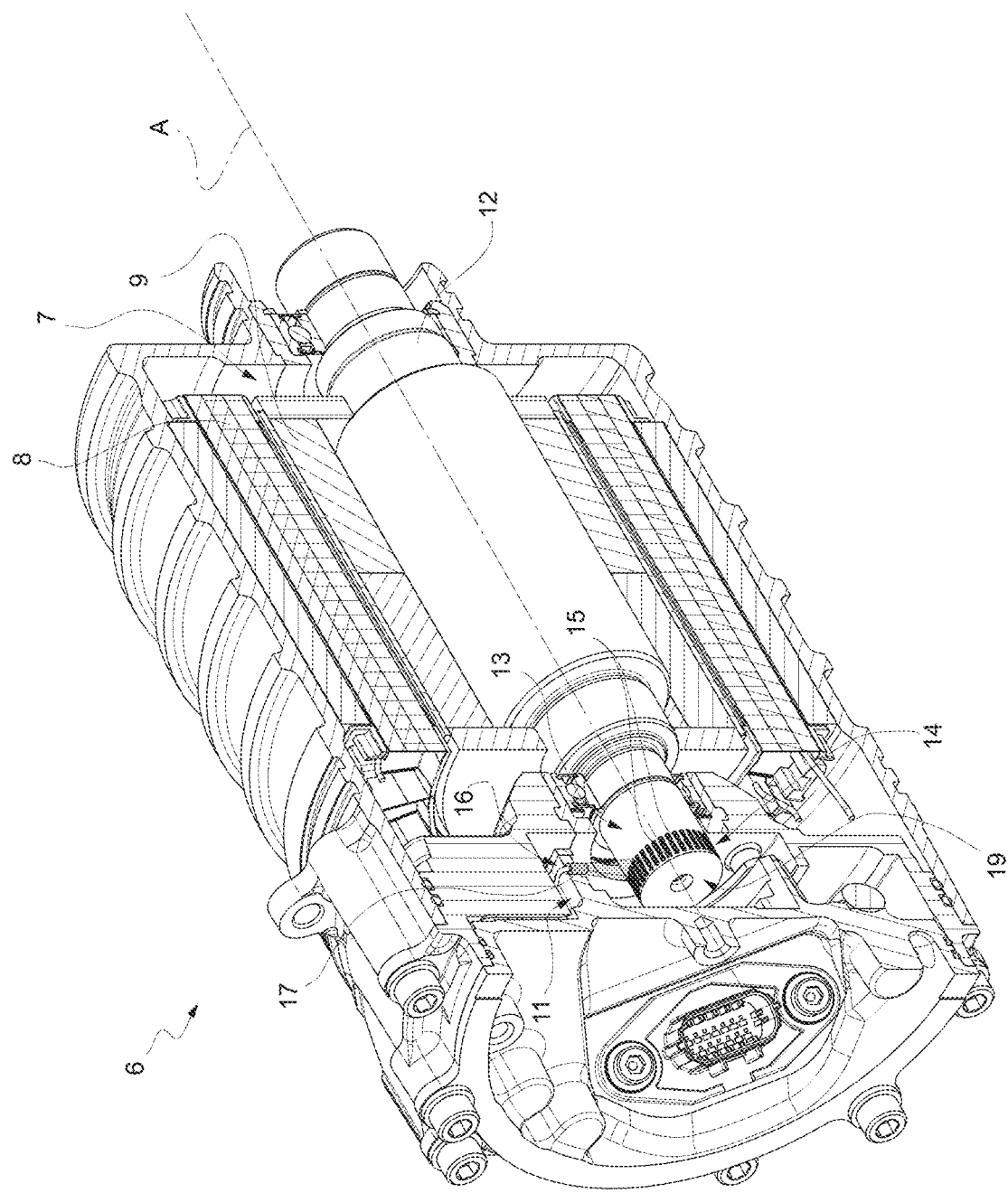
FIG. 2 is a perspective and schematic sectional view, with details removed for the sake of clarity, of an electric actuator apparatus in accordance with a first embodiment.
Figure 3:
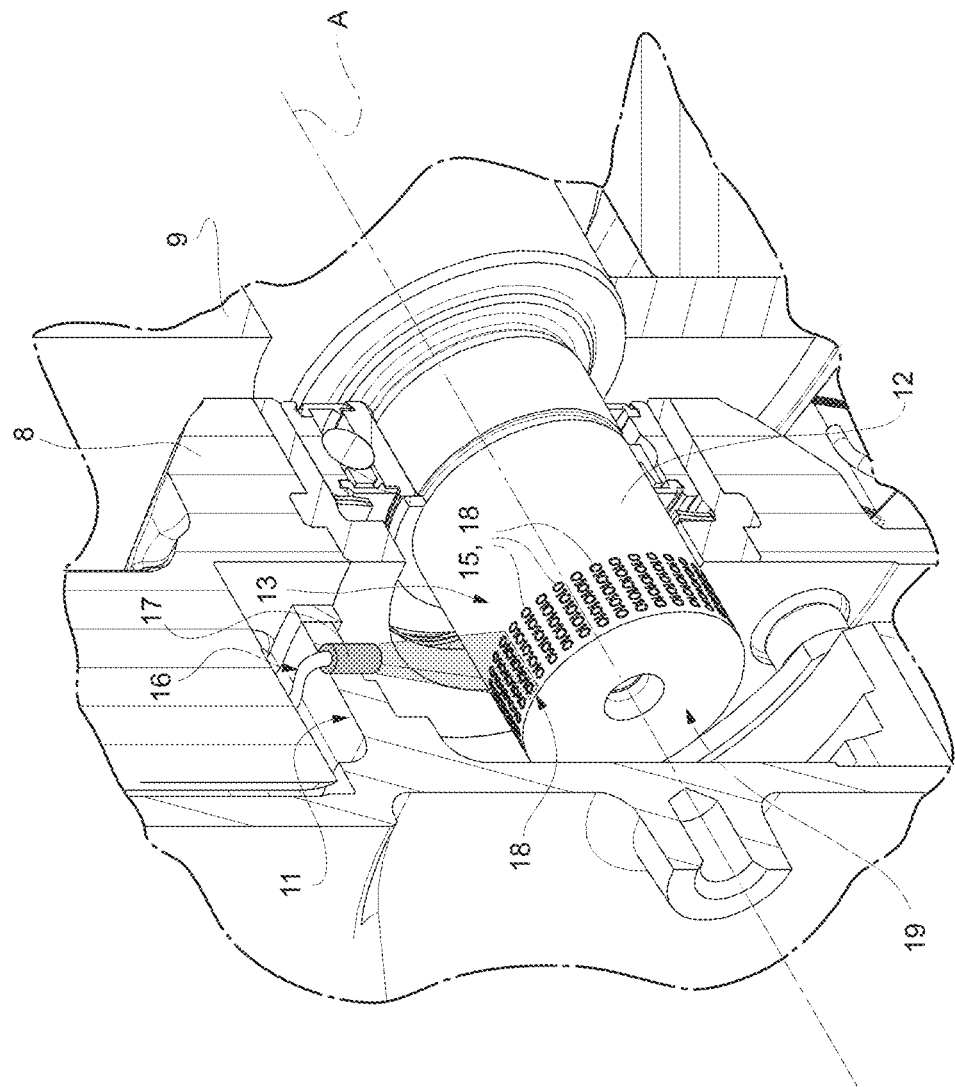
FIG. 3 is a detail of FIG. 2.

In some non-limiting cases, such as that illustrated in FIGS. 2 and 3, the reading portion 13 comprises (is) an end 19 of the shaft 12 integral with the rotor 9 of the electric motor 7. Thereby, the mounting of the sensor element 16 would be simplified in that the end 19 comes out of the rotor 9 (i.e., from one of the bases of the cylindrical volume defined by the rotor 9).

Alternatively, or in addition, as even more sensor elements 16 could in general be combined to increase the accuracy, the reading portion 13 comprises (is) a base disc of the rotor 9 of the electric motor 7. In so doing, the coded surface would be larger and allow for a greater number of rows 18.

In some non-limiting cases, as in the embodiment of FIGS. 2 and 3, the encoded surface 14 is parallel to the axis A of rotation of the rotor 9.

Figure 4:
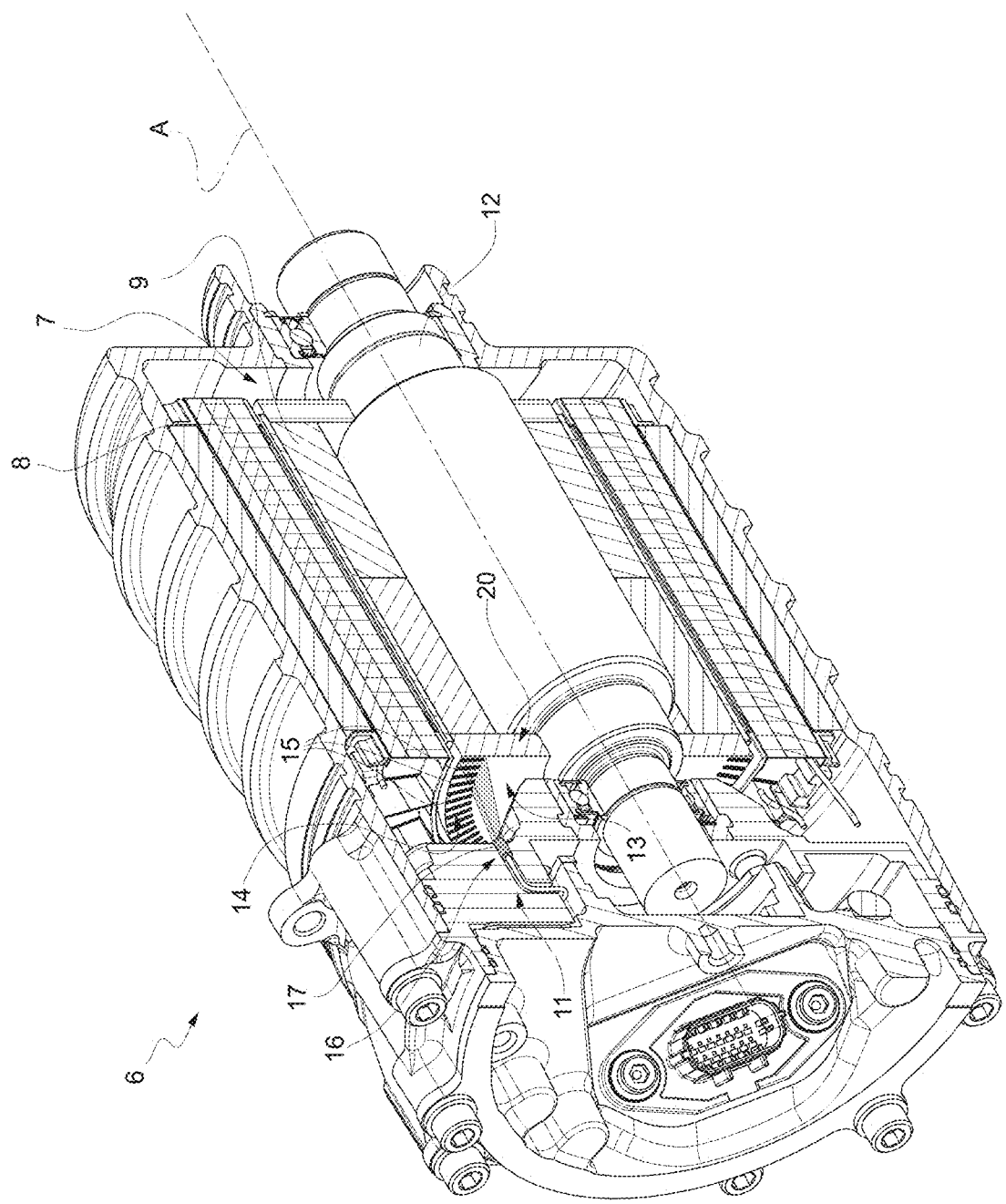
FIG. 4 is a perspective and schematic sectional view, with details removed for the sake of clarity, of an electric actuator apparatus in accordance with a second embodiment.
Figure 5:
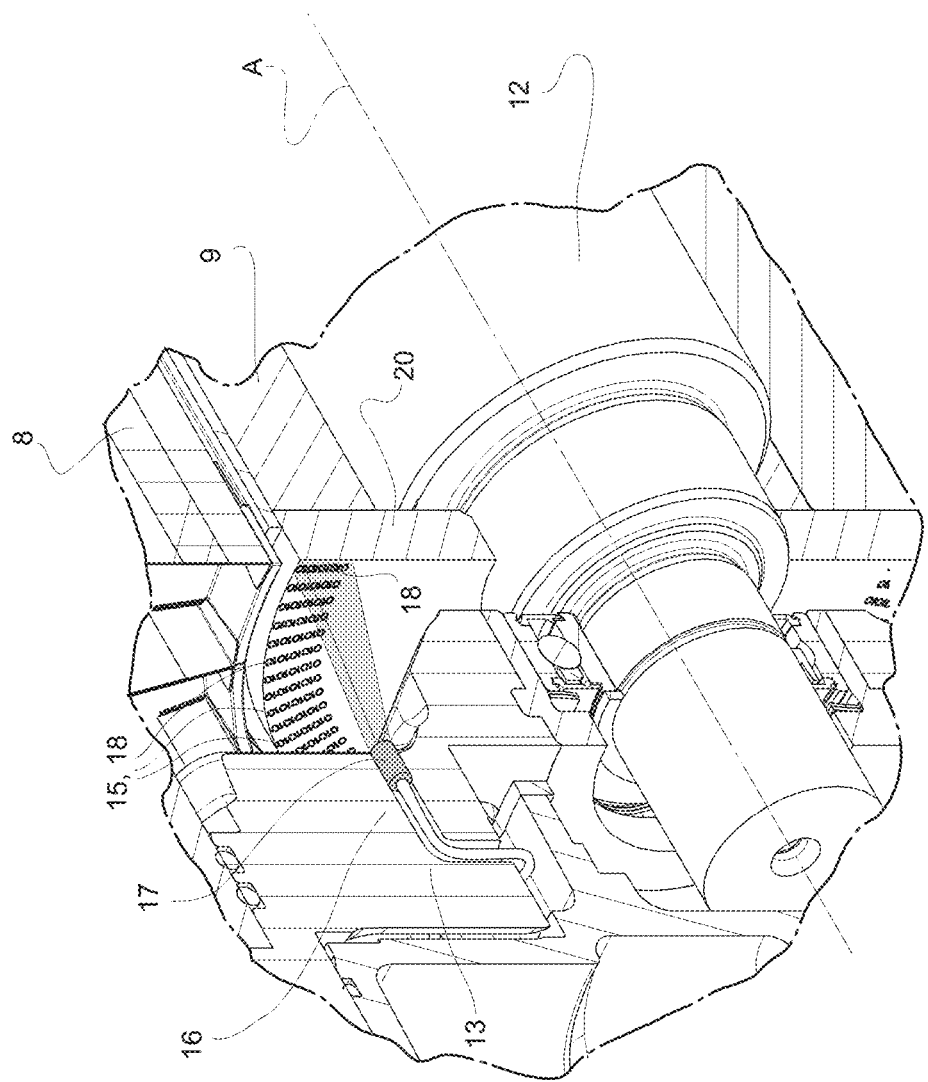
FIG. 5 is a detail of FIG. 4.

In other non-limiting cases, as in the embodiment of FIGS. 4 and 5, the encoded surface 14 is transverse, in particular perpendicular, to the rotation axis A of the rotor 9.

Regardless of the orientation of the encoded surface 14, the sensor member 16 is mounted so as to be viewed perpendicularly to the encoded surface 14, so as to optimize reading of the encoding 15.

According to some preferred non-limiting embodiments, each code 15 comprises a binary-coded line 18. In particular, the term "binary" means any coding providing for two different conditions. For example, an encoding 15 would be binary in the case of peaks and valleys in row 18, or if values of zero and one were printed, or different figures.

According to further non-limiting and non-illustrated embodiments, the coding 15 comprises a bar-coded or alphanumeric-coded line 18.

Advantageously but not necessarily, and as visible from FIGS. 3 and 5, each coding line 18 corresponds to a specific angular position of the rotor 9 of the electric motor 7.

In particular, the reading portion 13 has at least one line for each degree of a turn angle. In other words, the reading portion 13 comprises at least 360 rows, preferably at least 720 rows. Obviously, increasing the number of rows increases the resolution of the position detection system.

According to some preferred non-limiting embodiments, the actuator apparatus 6 is part of the propulsion system 4. In other words, the electric motor 7 is configured to deliver driving torque to at least one or both of the front wheels 2 and/or to one or both of the rear wheels 3.

Alternatively, or in addition, but not limited to, the actuator apparatus 6 is configured to operate an accessory device, which is not essential for the driving of the road vehicle 1, for example windows, doors, seats, and any actuator controlled in feedback.

In particular, the actuator apparatus 6 may also be successfully used to actuate an active suspension, for example of the type described in Applicant's application 102022000007496.

In use, the sensor element 16, the control unit 10 processes, preferably in real time, the exact angular position of the rotor 9 by decoding the signals detected by the sensor element 16, thus, for example, the photons perceived by the photodetector 17 of the SPAD type. Upon detection, the unit 10 is able to centrally control the mode of the electric motor 7 by implementing known control algorithms (e.g., PID, feedforward, etc.).

Although the invention described above makes particular reference to a very precise example of embodiment, it is not to be considered limited to this example of embodiment, as all those variants, modifications or simplifications covered by the attached claims fall within its scope, such as for example a different type of road vehicle (for example with hybrid traction), a different form of the coded surface, a different position of the lines, a different reading technology, etc.

The actuator apparatus and vehicle described above have numerous advantages.

First of all, they allow to lighten the structure of the road vehicle, removing encoder/resolver and the circuitry connected to them, thus allowing to increase the performance at the same expressed power.

In addition, they allow to simplify the assembly of the actuator apparatus, since the angular position detection system is directly integrated into the engine and does not require special precautions on the part of experienced personnel.

A further advantage of the present invention lies in the fact that, thanks to the presence of specific coding lines for certain angular positions, the absolute position of the electric motor to be controlled is detected in a mechanically simpler and more reliable way. In this way, it is possible to avoid any error in reading the position when the road vehicle is switched on, ensuring that the vehicle always moves in accordance with the driver's wishes, thus protecting the safety of the driver himself, the vehicle, and any individuals around the vehicle.

Furthermore, the present invention allows to control in an economical, simple, and safe way any type of electric motor, vehicular and not.

Finally, the use of a laser technology such as spad photodetectors allows to drastically reduce the calculation time compared to an optical device, thus giving the possibility of increasing the number of rows to be read, i.e., the number of detectable positions and therefore the accuracy of the detection.

LIST OF FIGURE REFERENCE NUMBERS

1 road traffic vehicle
2 front wheels
3 rear wheels
4 propulsion system
5 passenger compartment
6 actuator apparatus
7 electric motor
8 stator
9 rotor
10 control unit
11 detection system
12 shaft
13 reading portion
14 coded area
15 encodings
16 sensor element
17 photodetector
18 row
19 end
20 base disk
A rotation axis

The invention claimed is:

1. An electric actuator apparatus (6) comprising:
an electric motor (7), comprising in turn a stator (8) and a rotor (9), which is configured to rotate about an axis (A) according to the power transmitted by the stator (8);
a control unit (10) configured to control the electric motor (7) via a feedback control;
a position detection system (11) configured to provide the control unit (10) with an angular position of the rotor (9);
the electric actuator apparatus (6) being characterized by further comprising:
a reading portion (13), which is integral to the rotor (9) and provided with an encoded surface (14) on which a plurality of codes (15) that can be associated with the angular position of the rotor (9) are fixed;
an optical or laser sensor element (16), which is arranged integral to the stator (8) and so as to point toward the encoded surface (14)
the sensor element (16) comprises one or more single-photon, SPAD photodetector (17) diodes.

2. The apparatus (6) according to claim 1, wherein the sensor element (16) is a photodetector (17).

3. The apparatus (6) according to claim 2, wherein the encoded surface 14 is a seamless surface, i.e., without through holes.

4. The apparatus (6) according to claim 1, wherein the plurality of codes (15) are realized by laser printing.

5. The apparatus (6) according to claim 1, wherein each code (15) comprises a binary-encoded line (18).

6. The apparatus (6) according to claim 5, wherein each line (18) of code (15) corresponds to a specific angular position of the rotor (9) of the electric motor (7); in particular wherein the reading portion (13) has at least one line (18) for each degree of a turn angle.

7. The apparatus (6) according to claim 1, wherein the reading portion (13) is made of metal.

8. The apparatus (6) according to claim 7, wherein the reading portion (13) is made of one piece with the rotor (9) of the electric motor (7) or with a rotating shaft (12) thereof.

9. The apparatus (6) according to claim 1, wherein the reading portion (13) comprises an end (19) of a shaft (12) integral with the rotor (9) of the electric motor (7).

10. The apparatus (6) according to claim 1, wherein the reading portion (13) comprises a base disc (20) of rotor (9) of the electric motor (7).

11. The apparatus (6) according to claim 1, wherein the encoded surface (14) is parallel to the rotation axis (A) of the rotor (9).

12. The apparatus (6) according to claim 1, wherein the encoded surface (14) is transverse, in particular perpendicular, to the rotation axis (A) of the rotor (9).

13. A road vehicle (1) comprising:
four wheels (2, 3), of which at least one pair of wheels (2, 3) is driven;

the road vehicle (1) being characterized by comprising at least one apparatus (6) according to claim 1.

14. The vehicle (1) according to claim 13, wherein the actuator apparatus (6) is part of the system (4) of electric propulsion of the road vehicle (1).

15. The vehicle (1) according to claim 13, wherein the apparatus (6) actuator is configured to operate an accessory device and/or at least one active suspension.

* * * * *